US005108531A

United States Patent [19]

Quadracci

[11] Patent Number: 5,108,531

[45] Date of Patent: Apr. 28, 1992

[54] METHOD AND APPARATUS FOR STEREOGRAPHIC PRINTING WITH PRESHRINKING

[75] Inventor: Thomas A. Quadracci, Brookfield, Wis.

[73] Assignee: Quad/Graphics Inc., Pewaukee, Wis.

[21] Appl. No.: 347,653

[22] Filed: May 5, 1989

[51] Int. Cl.[5] .......... B32B 31/22; B41L 35/14; F26B 3/02

[52] U.S. Cl. .......... 156/277; 156/84; 156/387; 34/4; 34/18; 34/60; 34/68; 34/155; 101/424.1; 101/488; 118/46; 118/68; 118/102; 118/117; 427/264; 427/275; 427/322; 427/361

[58] Field of Search .......... 156/277, 84, 387, 384; 34/4, 155, 156, 68, 17, 18, 60; 101/488, 424.1; 118/46, 58, 68, 102, 117; 427/322, 361, 371, 271, 275, 264

[56] References Cited

U.S. PATENT DOCUMENTS

| | | | |
|---|---|---|---|
| 2,578,633 | 12/1951 | Mauffre | 34/60 |
| 2,900,738 | 8/1959 | Offen | 34/60 |
| 3,024,154 | 3/1962 | Singleton et al. | 156/277 |
| 3,666,465 | 5/1972 | Winnek | 355/77 |
| 3,725,184 | 4/1973 | Scopp | 156/277 |
| 4,278,022 | 7/1981 | Fitzpatrick et al. | 101/129 |
| 4,291,470 | 9/1981 | Newman | 34/60 |
| 4,408,400 | 10/1983 | Colapinto | 34/4 |
| 4,841,903 | 6/1989 | Bird | 101/217 |
| 4,939,992 | 7/1990 | Bird | 101/488 |

*Primary Examiner*—Wilbur Bascomb, Jr.
*Attorney, Agent, or Firm*—Foley & Lardner

[57] ABSTRACT

A method of highly accurate printing using a web offset press, particularly suited for stereographic printing. Consistent reproductions of a composite image are produced on a paper web, and registry between the image and an embossed screen is maintained, by preshrinking (e.g., reducing the moisture content of) the paper prior to printing the composite image on the paper web. Preshrinking the paper prevents the subsequent ink drying operation from causing shrinkage of the paper and concomitant variations in the image, permitting inline formation of a screen in accurate registry with the image.

15 Claims, 1 Drawing Sheet

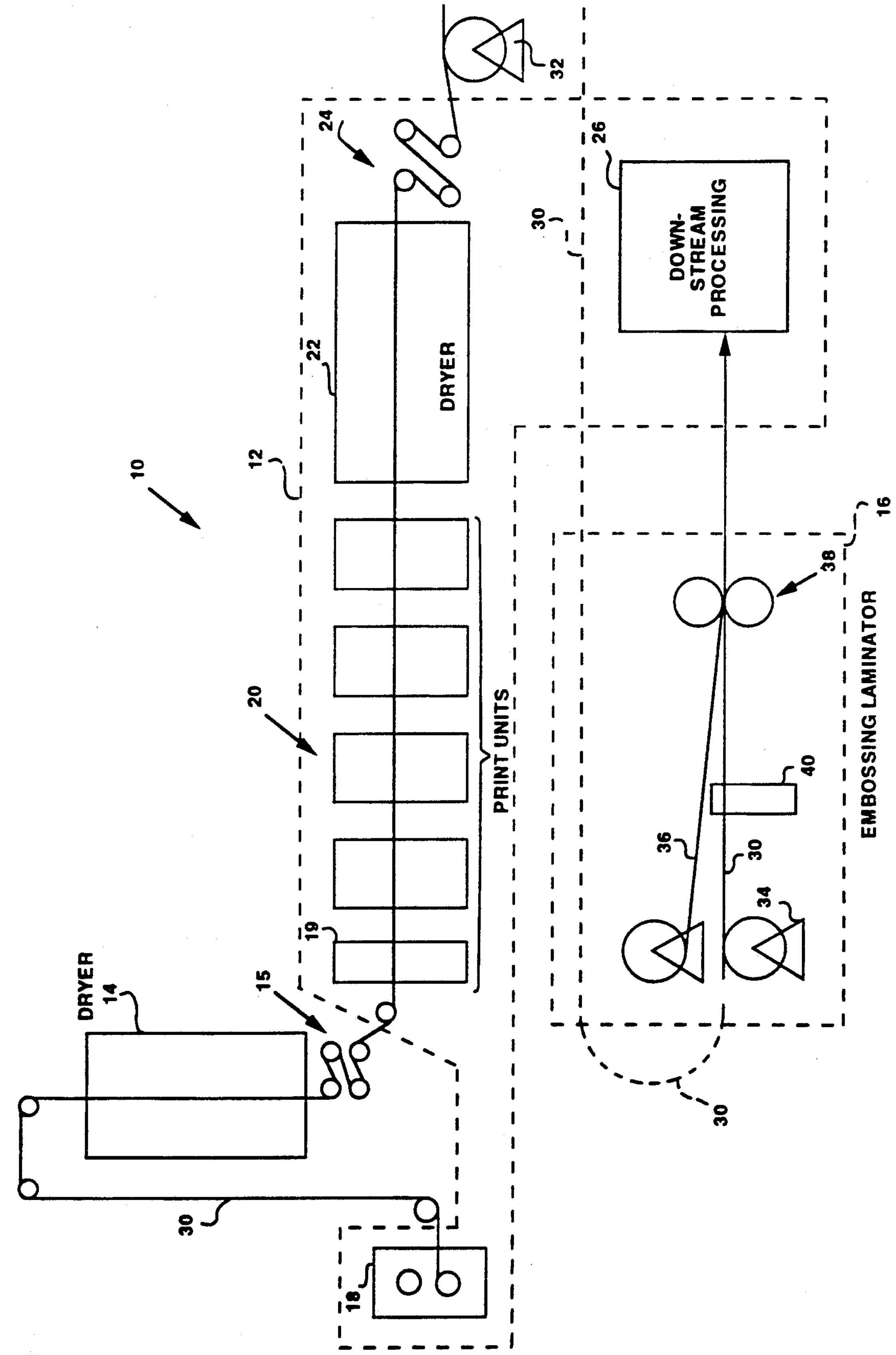
10
12
DRYER
22
24
32
26
DOWN-
STREAM
PROCESSING
30
20
PRINT UNITS
19
15
DRYER
14
30
18
16
38
EMBOSSING LAMINATOR
40
36
30
34
30

METHOD AND APPARATUS FOR STEREOGRAPHIC PRINTING WITH PRESHRINKING

FIELD OF THE INVENTION

The present invention relates to a method of highly accurate printing, and in particular, to a method for stereographic printing using a web offset press.

BACKGROUND OF THE INVENTION

Methods for producing stereographic (3-D) images or photographs are, in general, well-known. Specialized photographic equipment is employed to capture a number of views of a subject from different angles. The respective views are then merged to create a composite (typically lineiform) image. Classicly, a composite image has been generated by photographing the subject from a plurality of angular positions onto a film having a "taking screen" (line or lenticular) disposed in front of the film. The screen is shifted slightly with respect to the film at each angular position so that a series of vertical line images corresponding to the angular position at which the photograph is taken is provided at each screen position, resulting in a lineiform image. Suitable apparatus for generating composite images is described in U.S. Pat. No. 3,666,465, issued to Winnek on May 30, 1972. Another technique for generating composite images includes photographing the subject from a number of positions, onto a film maintained in a common plane at each of the positions. The camera lens is shifted relative to the film image plane in accordance with the position to maintain the same field of view extremities relative to the subject and the same focus point on the subject relative to a line from the center of the lens. Such an apparatus is described in U.S. Pat. No. 4,724,449 issued to Wright on Feb. 9, 1988.

Typically, a composite image is subjected to a three-step process to realize the stereographic effect. The composite image is printed on a substrate (e.g., paper). A clear coating, typically plastic, is then applied over the composite image, and a screen or grating, in accordance with the method employed to generate the composite image (e.g. a lenticular screen for a lineiform image) is embossed in the coating in registry with the image. Reference is made to U.S. Pat. Nos. 3,420,663, 3,462,226, and 2,297,846 issued to Huffaker on Jan. 7, 1969, Huffaker et al. on Aug. 19, 1969, and von Benschoten on Oct. 6, 1942, respectively.

It is recognized that precise registry between the image and the overlying embossed screen must be maintained. For example, the lenticules of an embossed lenticular screen must correspond precisely in number to the number per inch in an underlying lineiform image, and precisely parallel the lines of the image. In the absence of such registry, the stereoscopic effect is inconsistent, at best, due to, for example, generation of moiré pattern. With respect to lineiform composite images, a mismatch of as little as 0.005 line per inch can cause unacceptable objectional confusion.

Reproduction of the 3-D pictures has, in the past, been effected employing a sheet fed lithographic printing press. The composite image is printed on individual sheets, which are then taken to a separate laminating machine where the coating is applied and embossed with the screen. Examples of such systems are described in the aforementioned Huffaker U.S. Pat. No. 3,462,226, and von Benschoten U.S. Pat. No. 2,297,846.

Sheet fed apparatus, however, are not capable of operating at speeds comparable to typical operating speeds of a web offset printing press, e.g., 1600 ft./min. Thus, a process that would permit generation of the stereoscopic images at web offset press speeds has long been needed in the industry. However, web offset presses have typically not been employed to reproduce composite images for stereographic pictures.

The present inventor has determined that composite images printed by conventional web offset printing press, are generally not suitable for providing acceptable stereographic pictures, due, primarily, to difficulty in maintaining registration between the composite image and the embossed screen. Web offset presses typically employ inks, which require drying at relatively high temperatures in order to evaporate solvents in the ink. The drying step, however, also tends to cause the paper to shrink, thus distorting the image printed thereon. Such shrinkage tends to be inconsistent, variable, and nonlinear. Shrinkage tends to vary with paper type, from one roll of paper of a given type to the next, and even within a given roll of paper, depending upon, e.g., variations in moisture content of the paper, and the instantaneous tension on the web. Thus, the images on the web after the drying process tend to vary in size and relative position from the image as printed, (e.g., reflected on the printing plates). While such size and positioned deviations are not significant in most applications, the critical registry between the image and image overlying screen in a stereographic print tends to be lost, resulting in an unacceptable stereographic print.

SUMMARY OF THE INVENTION

The present invention provides a method and apparatus employing a web offset printing press to print stereographic images. The present inventor has determined that by preshrinking (e.g., reducing the moisture content of) the paper prior to printing the composite image on the paper the subsequent ink drying operation does not cause shrinkage of the paper or concommitant variation of the image. Thus consistent reproductions of the composite image are produced and registry between the embossed screen and image can be maintained.

BRIEF DESCRIPTION OF THE DRAWING

The present invention will hereinafter be described in conjunction with the appended drawing, the sole FIGURE of which is a block schematic of a web offset system for providing stereographic prints.

DETAILED DESCRIPTION OF A PREFERRED EXEMPLARY EMBODIMENT

Referring now to the drawing, a web offset stereographic printing system 10 in accordance with the present invention suitably comprises a conventional web offset printing system 12 cooperating with a conventional dryer 14 (sometimes hereinafter referred to as first dryer 14 or preliminary dryer 14) with an associated chill roll 15 and a conventional embossing laminator system 16.

Web offset press 12 suitably comprises a conventional web dispensing apparatus such as a roll changer 18, a conventional web guide 19, a series of printing units 20, a conventional dryer 22 (sometimes hereinafter referred to as "second" or "ink" dryer 22) with associated chill rolls 24, and suitable downstream processing apparatus such as conventional folders, rotary cutters, or the like, as well known in the art. It will be understood that offset press system 12 may comprise various additional apparatus in addition to those shown, and, in practice, would typically include various additional conventional components and controls.

Web offset printing system 12 operates in a conventional manner to imprint a web 30, with ink reproductions of a composite, e.g. lineiform, image. The composite image may be developed by any suitable technique such as, for example, that described in the aforementioned Wright U.S. Pat. No. 4,724,449. Web 30, typically paper, is dispensed from apparatus 18, and ultimately routed through web guide 19 to print units 20. Print units 20 cooperate to deposit ink reproductions of the composite image on web 30. Web 30 is then routed through ink dryer 22, which heats the web to evaporate various solvents in the ink. Ink dryer 22 is typically a hot air impingement dryer operating at air temperatures and web dwell time chosen to ensure evaporation of solvents in the ink. For a press operating at speeds on the order of 1600 feet per minute, the length of the dryer is typically on the order of 22 feet, and air temperature on the order of 350° F., providing for a web exit temperature of on the order of 280° F. or greater. After drying web 30 passes to chill rollers 24 which cools the web and sets the ink. In conventional web offset printing systems, the web would then be routed to downstream processing apparatus 26.

In accordance with the present invention, preliminary dryer 14 and associated chill rolls 15 are interposed in the web path preceding print units 20, suitably between roll changer 18 and web guide 19, and embossing laminator 16 is operatively interposed between chill roll 24 and downstream processing apparatus 26.

As previously noted, in the absence of preliminary dryer 14, the drying process in dryer 22 not only tends to evaporate the solvents from the ink, but also to evaporate moisture in the paper, causing nonuniform shrinkage of web 30. Dryer 14, interposed in the web path prior to print units 20 subjects web 30 to heating to reduce the moisture content of web 30 prior to printing, so that the drying operation subsequent to printing does not cause shrinkage of the web and concommitant distortion of the printed image. Dryer 14 typically reduces the moisture content of the web, at least to the extent that the moisture content would otherwise be reduced by ink dryer 22, and preferably removes substantially all moisture from the web. Preliminary dryer 14 also preferably effects any non-moisture related shrinkage and the web that would otherwise be caused by ink dryer 22. For a 1600 foot per minute system, preliminary dryer 14 is suitably an air impingement dryer having a length of on the order of 16–18 feet, adapted to provide a web exit temperature of on the order of 280° F. Such a preliminary dryer 14 is typically sufficient to remove essentially all moisture from the web, and, in any event, provide all necessary preshrinkage of the web. By sufficient moisture content of the web, tending to preshrink the web, prior to operation of print units 20 on the web, there is little if any further reduction in the moisture content of the solvents in the ink and shrinkage is avoided. Thus, web 30, as it exits chill rolls 24 bears consistent reproductions of the composite image.

A predetermined screen is then formed, overlying and in registry with the reproductions of the composite image, e.g., a coating is deposited on web 30 overlying the reproductions of the composite image and a predetermined screen formed in the coating disposed in registry with the reproductions. More specifically, the imprinted web is operated upon by embossing laminator 16. If desired, embossing laminator 16 can be disposed in line with press 12, or web 30 can be rewound on, for example, a conventional reel stand 32 then transported to an off-line reel stand 34 or other dispenser associated with laminating system 16. Web 30 is applied, together with a suitable coating, e.g., sheet 36 to the rollers 38 of laminator 16. Coating sheet 36 is typically a clear plastic, such as polyethylene and polycarbonate.

Rollers 38 laminate coating 36 and web 30 and emboss coating 36 with a predetermined pattern corresponding to the technique employed to create the composite image reproduced by print units 20, e.g. a lenticular screen. A suitable web guide 40 is employed to regulate the position of web 30 relative to rollers 38, to ensure registration between the image and the embossed pattern. A suitable web guide is described in U.S. patent application Ser. No. 181,980, filed by David L. Mundschau on Apr. 15, 1988. The embossed web is then routed to downstream processing apparatus 26.

It should be appreciated that the routing of web 30 is schematically shown; in practice, the routing of web 30 to the varous components would be effected using rollers, air turns and other conventional techniques. Further, the foregoing description is of a preferred exemplary embodiment of the present invention, and the invention is not limited to the specific forms shown. For example, while the preferred embodiment of the invention relates to stereographic printing, the preliminary reduction in moisture content of the web in accordance with the present invention can be employed in other printing applications where highly consistent reproduction of images are desired. Further, while the preliminary drying step is described as being effected in a separate dryer, such step could be effected by routing the web through the same drying unit, first before and then after printing. These and other modifications may be made in the design and arrangement of the elements within the scope of the invention as expressed in the appended claims.

I claim:

1. A method of forming stereoscopic images comprising:

preshrinking a web;

printing reproductions of a composite image on said preshrunken web;

drying said printed reproductions on said web;

depositing a coating on said web overlying said reproduction of said composite image; and forming a predetermined screen in said coating disposed in registry with said composite image.

2. The method of claim 1 wherein said pre-shrinking step comprises the step of routing said moving web through a dryer prior to said printing step.

3. The method of claim 1 wherein said depositing a coating step comprises the step of depositing a clear coating on said web.

4. The method of claim 1 wherein said depositing a coating step comprises the step of depositing a coating of plastic material on said web.

5. The method of claim 1 wherein said depositing a coating step comprises the step of laminating said web with a coating material.

6. A system for forming stereoscopic images from composite images corresponding thereto, said system comprising:

means for preshrinking a moving web;

printing means for reproducing said composite image on said preshrunken web;

means for drying said composite image;

means for depositing a coating on said web overlying said reproductions of said composite image; and means for forming a predetermined screen in said coating, disposed in registry with said composite image.

7. The system of claim 6 wherein said means for preshrinking and said printing means are disposed along a common web path, with said means for preshrinking disposed preceding said printing means along said path.

8. The system of claim 6 wherein said means for preshrinking comprises a dryer.

9. The system of claim 6 wherein said means for coating comprises a laminator.

10. A web fed printing system of the type operating on a web moving along a web path, said system comprising at least one print unit disposed along said web path and a print dryer disposed along said web path downstream of said print unit, said web being of the type susceptible to changes in dimensions upon reduction of the moisture content thereof, wherein the improvement comprises said system further comprising a preliminary dryer means, disposed along said path preceding said print unit, for drying said web prior to application of print onto said web to militate against dimensional changes in said web by said print dryer.

11. A web fed printing system of the type operating on a web moving along a web path, said system comprising at least one print unit disposed along said web path and a print dryer disposed along said web path downstream of said print unit, said web being of the type susceptible to changes in dimensions upon reduction of the moisture content thereof, wherein the improvement comprises said system further comprising a preliminary dryer disposed along said path preceding said print unit, said print unit being adapted to print a composite image on said web and said system further including means for forming a predetermined screen overlying and in registry with said composite image.

12. The system of claim 10 wherein said preliminary dryer comprises an air impingement dryer of a length in the range of approximately 16 to 18 feet and generating a web exit temperature of at least on the order of 280° F.

13. A method of printing images on a moving web, of the type including the steps of routing said moving web to at least one printing unit, imprinting said image in ink on said web, and drying said ink, said ink drying step tending to cause dimensional changes in said web, wherein the improvement comprises said method including the further step of preshrinking said web prior to said imprinting step to prevent such dimensional changes to the web from occurring in said drying step.

14. The method of claim 13 wherein said preshrinking step comprises the step of subjecting said web to heat sufficient to cause such dimensional changes, prior to said imprinting step.

15. The method of claim 13 wherein said preshrinking step comprises the step of reducing the moisture content of said web.

* * * * *